United States Patent [19]
Rose

[11] Patent Number: 5,612,711
[45] Date of Patent: Mar. 18, 1997

[54] DISPLAY SYSTEM

[75] Inventor: Steven B. Rose, Grandview, N.Y.

[73] Assignee: Tally Display Corporation, Grandview, N.Y.

[21] Appl. No.: 682,868

[22] Filed: Jul. 9, 1996

Related U.S. Application Data

[63] Continuation of Ser. No. 590,103, Jan. 25, 1996, abandoned, which is a continuation of Ser. No. 210,784, Mar. 18, 1994, abandoned.

[51] Int. Cl.$^6$ .................................................... G09G 3/20
[52] U.S. Cl. .................................... 345/59; 340/815.65
[58] Field of Search .............................. 345/33, 34, 59, 345/87; 340/815.44–815.67, 825.5–825.52, 825.35

[56] References Cited

U.S. PATENT DOCUMENTS

| | | | |
|---|---|---|---|
| Re. 32,365 | 3/1987 | Sebestyen | 345/82 |
| 3,774,161 | 11/1973 | Chambers | 345/141 |
| 3,909,818 | 9/1975 | Dalke et al. | 345/124 |
| 3,981,002 | 9/1976 | Gardner | 340/323 R |
| 4,438,432 | 3/1984 | Hurcum | 345/1 |
| 4,599,611 | 7/1986 | Bowker et al. | |
| 4,630,039 | 12/1986 | Shimada | 345/141 |
| 4,660,107 | 4/1987 | Chippendale, Jr. | |
| 4,689,683 | 8/1987 | Efron | |
| 4,698,664 | 10/1987 | Nichols et al. | |
| 4,733,305 | 3/1988 | Miura et al. | |
| 4,758,833 | 7/1988 | Dunkerton et al. | 340/825.44 |
| 4,761,747 | 8/1988 | Gauder | |
| 4,779,134 | 10/1988 | Mak | |
| 4,799,146 | 1/1989 | Chauvel | |
| 4,806,924 | 2/1989 | Giraud et al. | 345/56 |
| 4,814,883 | 3/1989 | Perine et al. | |
| 4,845,481 | 7/1989 | Havel | 340/815.45 X |
| 4,929,936 | 5/1990 | Friedman et al. | 340/815.45 X |
| 4,952,927 | 8/1990 | DeLuca et al. | 345/124 |
| 4,987,492 | 1/1991 | Strults | |
| 5,029,008 | 7/1991 | Ferren | |
| 5,184,114 | 2/1993 | Brown | 345/83 |
| 5,255,185 | 10/1993 | Mowers et al. | 340/323 R |
| 5,283,733 | 2/1994 | Colley | 340/323 R |
| 5,295,064 | 3/1994 | Malec et al. | 340/825.35 |

FOREIGN PATENT DOCUMENTS

| | | | |
|---|---|---|---|
| 8903571 | 4/1989 | WIPO | 340/825.54 |

OTHER PUBLICATIONS

Dyche, M., Proportionally Spaced Dot Matrix Display, IBM Tech. Disclosure Bulletin, vol. 21, No. 4, Sep. 1978, pp. 1676–1677.
Inmos. IMS G174 High Colour Palette—DAC With "Pix Mix", Nov. 1991.
IBM Technical Disclosure Bulletin, vol. 21, No. 4, Sep. 1978, pp. 1676–1677.

*Primary Examiner*—Ulysses Weldon
*Attorney, Agent, or Firm*—Sprung Horn Kramer & Woods

[57] ABSTRACT

A display comprising a matrix of display pixels each receptive of a drive signal for energizing same to emit light of one of a plurality of colors and circuitry receptive of serial data corresponding to a message and at least one color for the message for converting same into drive signals. The display is used alone or in a router tally display system or a sports scoreboard system.

7 Claims, 6 Drawing Sheets

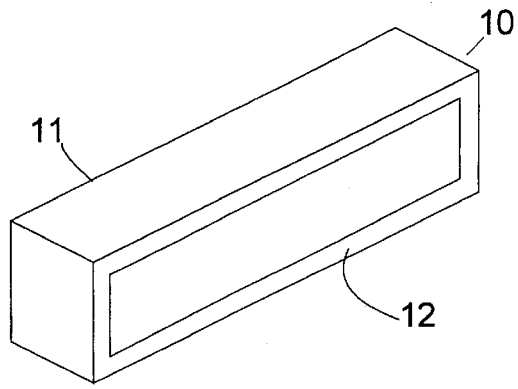
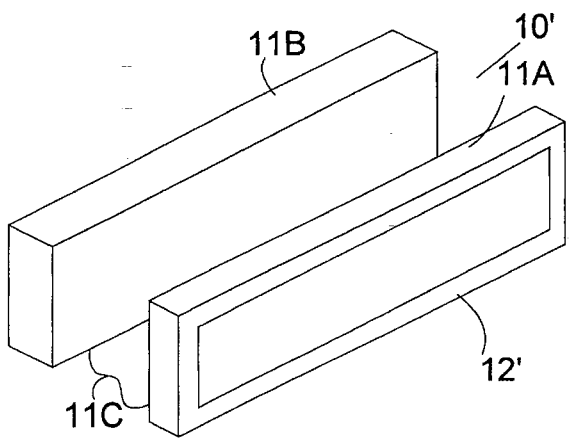
FIG. 1  FIG. 2
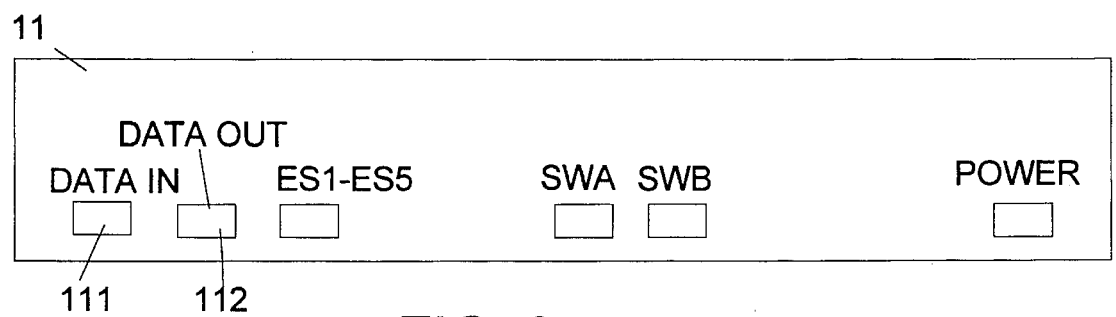
FIG. 3
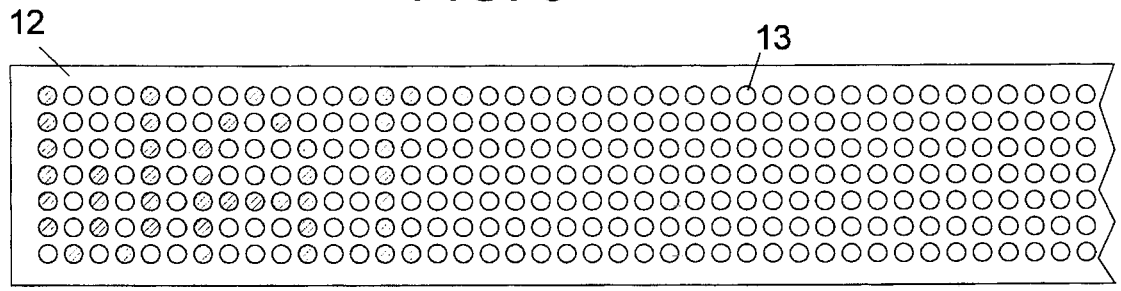
FIG. 4

DISPLAY SYSTEM

This application is a continuation of application Ser. No. 08/590,103, filed Jan. 25, 1996, which is a continuation of application Ser. No. 08/210,784, filed Mar. 18, 1994 both now abandoned.

BACKGROUND OF THE INVENTION

The present invention relates to a display system, and in particular, to display systems for use in the broadcasting industry.

Display systems for a broadcast control room are known and range from the use of masking tape adhered to a television monitor to indicate the program source therefor to a basic three color matrix display which is controlled by a programmed microcomputer, process control computer or data input device.

SUMMARY OF THE INVENTION

The main object of the present is to improve the operation of the known display systems and to provide more flexibility during use.

Another object of the present invention is to provide an improved matrix display which can be made in two parts to enable the visual output section thinner and thus more easily able to be mounted in a control room setting.

Still another object of the present invention is to provide a parallel to serial interface between the production switcher, or any contact closure or voltage, which is controlling the program sources to the monitors in the broadcast control room and the display system.

A further object of the present invention is to provide a time code function for the display system which can lock a clock internal to the display system to an external time code reference.

A still further object of the present invention is to provide a router tally display system which allows the user to show real time router and tally status information directly underneath monitors in a studio.

A further object of the present invention is to provide a sports scoreboard display system.

A still further object of the present invention is to provide local and remote messaging capabilities, while simultaneously providing source identification and source status. This is accomplished by the individual display's ability to store and display 32 separate messages, and receive data from process control devices.

These messages can be of any size and not limited by the number of pixels since the display incorporates the ability for the information to appear as multiple frames that are presented in user selected fashion.

A still further object of the RTDS system is to provide a means to incorporate additional tally channels other than those that are available from the production switcher and to be able to transmit this tally information throughout the system.

A still further object of the RTDS system is to provide a means for personnel in remote locations of following, or tracking the activity in production area's.

A still further object of the present invention is to provide a system for incorporating enough (256) separate addresses to monitor all the sources in a large facility. Multiple addresses can be used by disabling the "talk back" circuitry.

A still further object of the present invention is to provide a means of supplying information, message annunciation, machine identification and machine status to all personnel within a facility by utilizing existing wiring within the facility or via modem.

These and other objects and advantages of the system according to the present invention are achieved in accordance with the present invention by a display comprising a matrix of display pixels each receptive of a drive signal for energizing same to emit-light of one of a plurality of colors, means receptive of serial data corresponding to a message and at least one color for the message for converting same into drive signals and input means receptive of an external color control signal for overriding the at least one color for the message from the serial data for changing the color of the message to one predetermined color. The means for converting also comprises an asynchronous receiver-transmitter for receiving and transmitting serial data and means for selecting baud rates for the transmission and receiving of serial data. The asynchronous receiver-transmitter receives and transmits serial data with handshaking signals and has means for disabling talk back communications upon receipt of data. In a preferred embodiment, the means for converting comprises a microprocessor and a clock therefor and means for synchronizing the clock to an external time reference. The means for converting also preferably comprises means for displaying the messages in a proportionally spaced font.

In another embodiment, the means for converting comprises a microprocessor and a random access memory capable of storing a plurality of messages with color data corresponding thereto and input means receptive of an external message control signal for overriding the current message from the serial data and for changing the message to a different one stored in the random access memory.

In a further embodiment, a first housing having the matrix of display pixels each receptive of a drive signal for energizing same to emit light of one of a plurality of colors and first means receptive of parallel data signals corresponding to a message and at least one color for the message for converting same into drive signals, a second housing have second means receptive of serial data corresponding to a message and at least one color for the message for converting same into said parallel data signals and a cable connecting the parallel data signals from the second means to the first means.

In accordance with the invention, at least one display each having a matrix of display pixels with each receptive of a drive signal for energizing same to emit light of one of a plurality of colors, means for determining an address for the display and means receptive of serial data corresponding to an address and a message and at least one color for the message for converting same into drive signals, a parallel to serial interface receptive of parallel color data from a switcher for converting same to serial data including an address and color data and means for applying the serial data to the at least one display. In the display system, the means for applying serial data to the at least one display preferably comprises means receptive of data from a router for converting said data into serial data corresponding to messages to be displayed.

Also in accordance with the invention, a sports scoreboard display system comprises a plurality of displays each having a matrix of display pixels each receptive of a drive signal for energizing same to emit light of one of a plurality of colors, means for determining an address for the display and means receptive of serial data corresponding to an address and a message and at least one color for the message for converting same into drive signals and means for controlling the displays to indicate team names, scores and game status in preselected colors.

These and other features of the present invention will be described in more detail in the following detailed description with reference to the attached drawings, wherein:

BRIEF DESCRIPTION OF THE DRAWINGS

FIG. 1 is a perspective view of a display according to the present invention;

FIG. 2 is a perspective view of an alternative embodiment of the display of FIG. 1;

FIG. 3 shows the back of the display of FIG. 1;

FIG. 4 is a detailed view of a portion of the front panel of FIGS. 1 and 2;

DETAILED DESCRIPTION OF THE INVENTION

Figure 5:
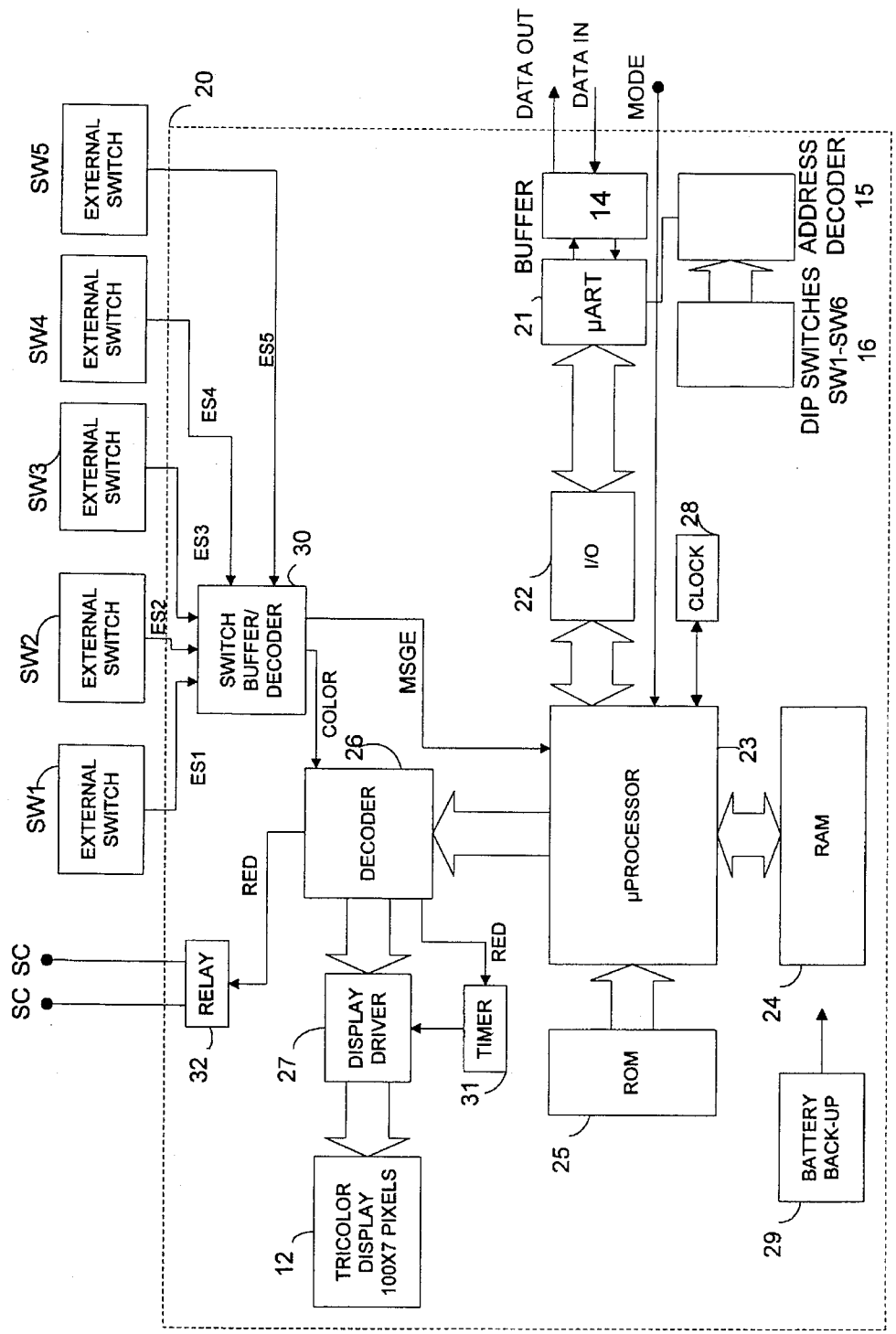
FIG. 5 is a block diagram of the circuit of the display of FIG. 1.

FIG. 1 shows a display 10 according to the invention having a housing 11 and a matrix display 12 of three color LED lamps 13 as shown in FIG. 4. The matrix is 7 elements high and 100–200 elements in length for displaying messages using alphanumerics such as shown in FIG. 4 or graphics. The font used to display the messages is a proportional spacing font where thinner letters are formed by lights only three across rather than the typical five for other letters.

In an alternative embodiment according to the present invention as shown in FIG. 2, the housing of the display is in two parts including a front housing 11A and a rear housing 11B. Housing 11A includes the display matrix 12' and all of the electronics related to the display are disposed in housing 11B so that housing 11A can be made relatively thin compared to the housing 11 shown in FIG. 1. In a preferred embodiment, the housing 11A is only ¾" in depth.

FIG. 3 shows the connectors at the rear of housing 11 and housing 11B and includes connectors 111, 112 for data in, data out, external switch inputs ES1–ES5 and power. That backplate also includes two switch arrays SWA and SWB which are used to control the display to set it into different modes. SWA is a DIP switch with 8 sections and is used for addressing, as will be explained hereinafter. SWB is a DIP switch with 8 sections used for various functions such as setting of baud rate, auto flash, talk back and color/message mode as will be explained hereinafter.

FIG. 5 shows the circuitry for the display of FIG. 1 within block 20.

The circuit 20 includes a micro asynchronous receiver-transmitter (μART) 21 which receives serial data in and which outputs serial data on the data in and data out connectors 111, 112 via buffer 14. The μART 21 communicates with an I/O circuit 22 to supply parallel data to microprocessor 23. Microprocessor 23 has an associated random access memory (RAM) 24, an associated read only memory (ROM) 25 and a clock 28. The microprocessor 23 also has two interrupt inputs for receiving external signals including the mode signal which will be described hereinafter and the MSGE signal from the switch buffer/decoder 30 which will also be described hereinafter.

Each display is addressed by a unique address set on dip switches 16 which are the 8 sections of switch SWA and which are set to a unique address (0 to 255) for the display. The settings of the switches, which preferably eight in number, are fed to address decoder 15 which provides the digital word corresponding to the address. The μART 21 is able to determine which data is directed to the display by matching the output of the address decoder 15 with the address data fed at the serial input.

The microprocessor receives the data which is converted from serial to parallel, and based on that data, sends parallel data to a decoder 26 for presenting the proper message on the display 12. Decoder 26 converts the data words from the microprocessor into controls for each LED in the display 12 and sends the signals to a display driver 27 which actually activates each pixel of the display to obtain the lighting thereof and the proper color thereof either red, green or yellow.

When the decoder 26 indicates to the display driver 27 that the display is to be in red, a signal RED is generated which is applied to a relay 32 and to a timer 31. Relay 32 receives the RED signal and closes the relay so that the two pins SC are connected together in a closed circuit. Moreover, the timer 31 receives the RED signal and produces a square wave to the display driver 27 which effects the flashing of the message on the display 12.

The switch buffer/decoder 30 has five inputs, ES1, ES2, ES3, ES4 and ES5, which are the inputs from external switches SW1, SW2, SW3, SW4 and SW5. The result of a change in these switches will effect the operation of the display, depending upon the setting of the mode input to the microprocessor. When the mode input is set for the display to operate in the color mode by one section of switch SWB, the closing of either one of switches SW1, SW2 or SW3 enables the switch buffer to produce the color signal which is applied to the decoder 26 and which overrides any color indication from the microprocessor and displays whatever message is being displayed on the display 12 in the color red.

When the mode input is in the message mode, the closing of any one of switches SW1, SW2 or SW3 sends the MSGE signal to the microprocessor. RAM 24 has a capability of loading 32 separate messages therein and thus has a minimum of 32K of memory. When the display is in the color mode, the microprocessor always loads message number one into the display. When the display is in the message mode, the settings of switches SW1, SW2, SW3, SW4 and SW5 enable the switch buffer 30 to send data to the microprocessor via signal MSGE to indicate to the microprocessor to select a different one of the 32 messages that are stored in RAM. As a result, the desired message is displayed on display 12. There are 5 "switches" for a binary input (1, 2, 4, 8, 16). All 5 are active in message mode, 3 are active in color mode.

The μART 21 permits the user to select different baud rates on switch SWB for the input and output serial data to the display preferably in accordance with RS-485 or RS-232. The μART is also capable of disabling talk back communication when desired by the user by setting switch SWB.

The clock 28 not only sends clock signals to the microprocessor but receives a signal from the microprocessor which enables the clock to be synchronized to an external reference, such as the SMPTE time code. The battery backup 29 powers all of the memory devices so that the loss of power will not result in a loss of data.

The microprocessor can also control the brightness of the display 12 by varying the duty cycle of the clock signal delivered to the driver 27 by the microprocessor through the decoder 26. Switch SWB can be set to make the display flash the message at all times.

Figure 10:
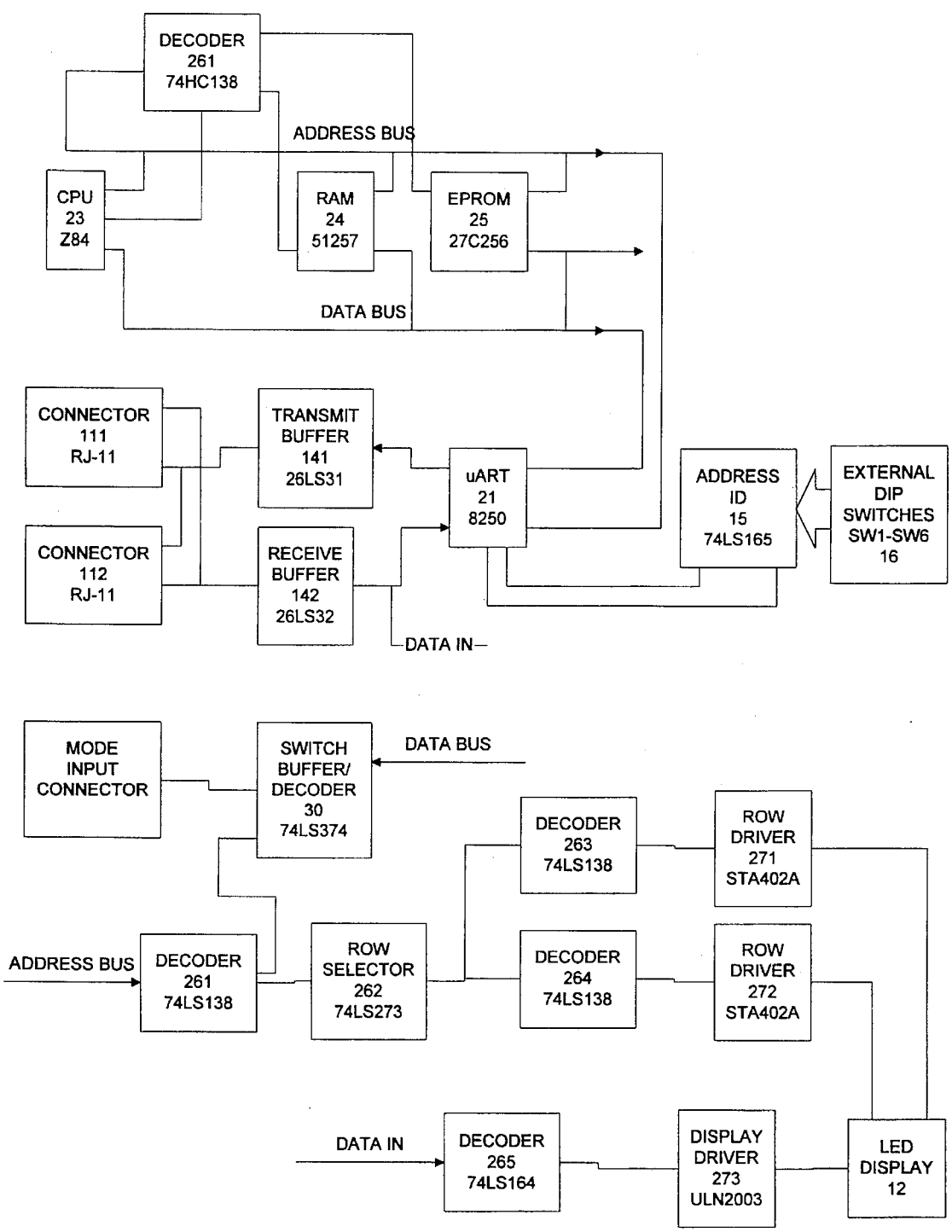
FIG. 10 is a more detailed block diagram of circuitry of FIG. 5.

FIG. 10 shows more details of the circuitry of FIG. 5, as well as the indications of the specific off the shelf devices that can be used to implement the circuit.

As shown therein, the RJ11 connectors 111, 112 are pass through connectors and thus either one can act as an input or an output. The connectors are connected to transmit buffers 141 and 142 which make up the buffer 14 and apply and receive data from µART 21. The µART 21 determines if the data is applicable to the display based on the address I.D. register 15 which receives the address identification from the dip switches 16.

The µART 21 is connected to both the data bus and the address bus as are CPU 23, RAM 24 and EPROM 25. The decoder 26 includes decoder element 260 which is connected to these circuit elements.

The address is also connected to decoder portion 261 which is also fed by the switch buffer/decoder 30 which receives the mode input from the mode input switch and the data from the data bus. Decoder 261 then feeds row selector 262 which in turn feeds decoders 263 and 264 which apply signals to row drivers 271 and 272 and which feed the LED display 12. The data in signal from the receive buffer 142 is connected to the decoder portion 265 which feeds a display driver 273 which acts as an enable for the LED display 12.

Figure 6:
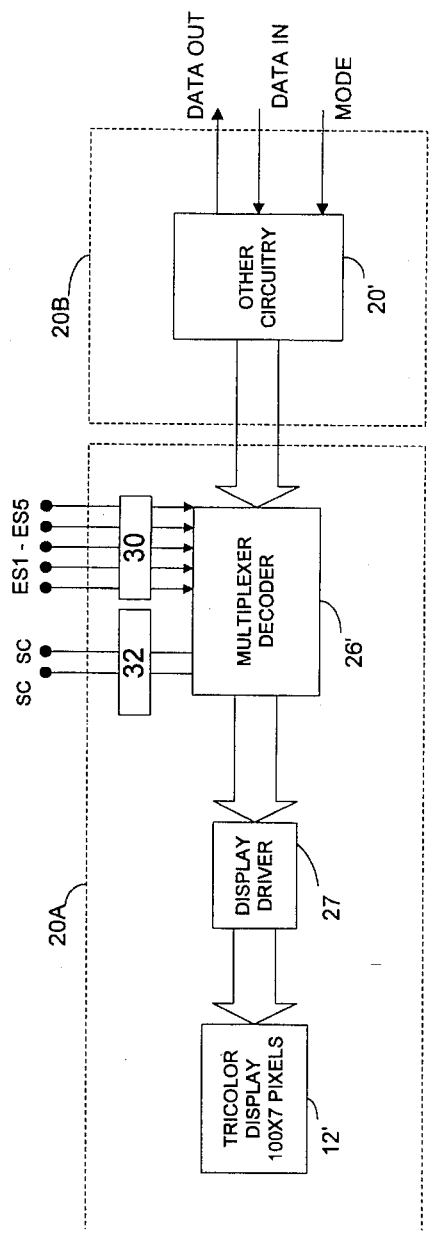
FIG. 6 is a block diagram of the circuit of the display of FIG. 2.

FIG. 6 shows the configuration of the circuitry of FIG. 5 for the display of FIG. 2. As shown therein, housing 11A includes circuitry 20A including the pixels for the display 12', the display driver 27 and a multiplexor decoder 26' which receives the external switch signals ES1–ES3 and which has the SC signals and relay 32 as well as the switch buffer 30. All of the other circuitry 20B is in housing 11B.

The multiplexor decoder 26' allows for 8 lines to be input from the microprocessor and converted to 16 bits of data, instead of the circuit shown in FIG. 5 where the 16 bits of data are sent directly from the microprocessor to the decoder 26.

Figure 7:
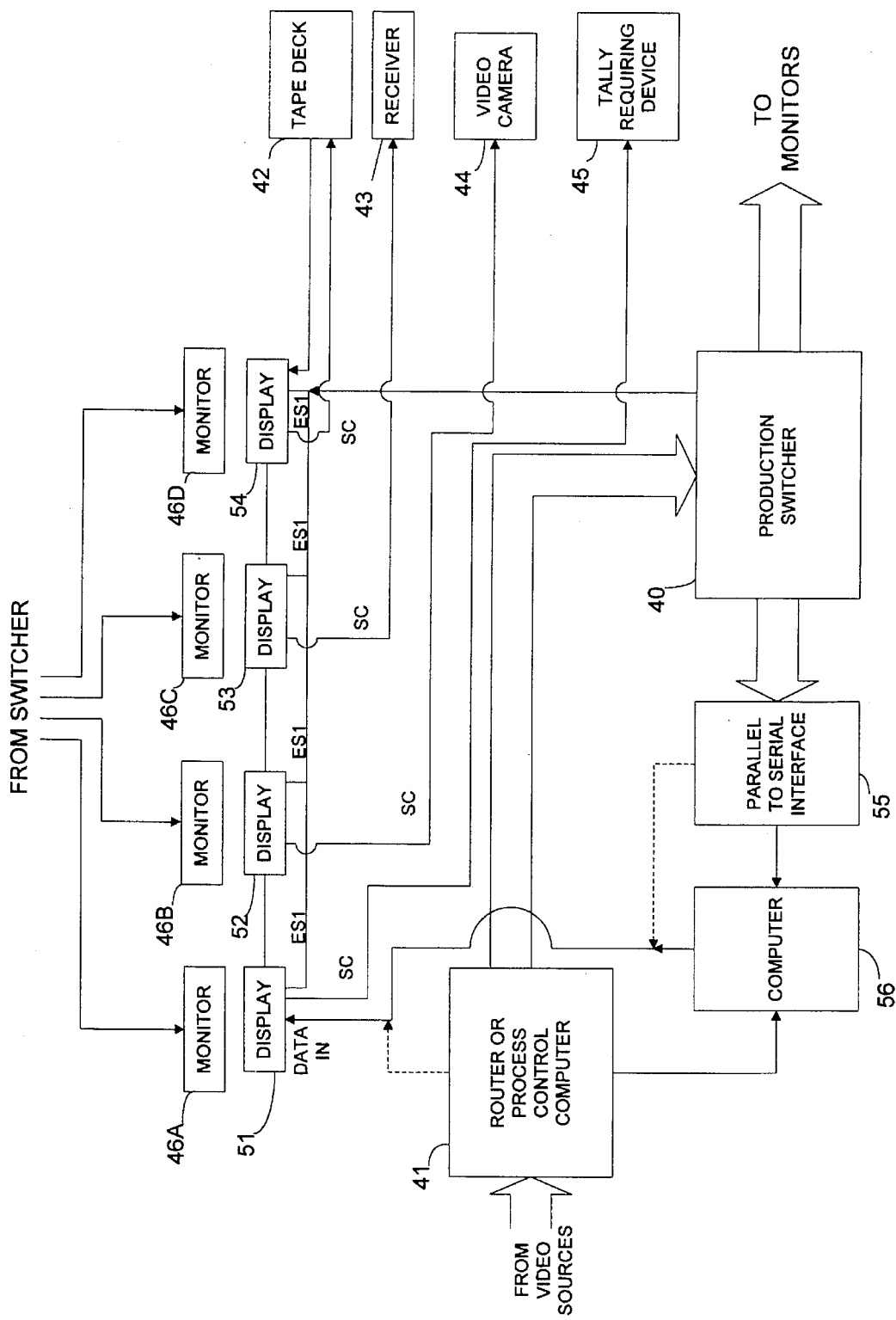
FIG. 7 is a block diagram of a router tally display system in accordance with the present invention.

The display according to the present invention is shown in use in a router tally display system in FIG. 7.

In that system, the displays 51–54 are associated with monitors 46A–46D which receive their video signals from a production switcher 40 which in turn receives video signals from a router or process control computer 41 connected to various video sources. Router 41, production switcher 40 and monitors 46A–46D are conventional commercial broadcast devices. Thus no further disclosure is made thereof.

The switcher 40 produces parallel outputs of 32 on or off lines which are fed to a parallel to serial interface 55 and the serial data is fed to the serial input of a computer 56 which is preferably a personal computer such as an IBM 386 or IBM 486 computer or optionally is connected directly to the serial data input of display 51. The displays 51–54 are daisy chained so that the data out connector of display 51 is connected to the data in connector of display 52 and so on. The computer 56 sends data to the displays 51–54 by addressing each by the same serial data. The address is determined at the µART of each display by setting the switch bank SWA to the desired address for each device.

The production switcher 40, or any device providing a contact closure or voltage, can alternately be connected to the external switch input 1 of each display so that the production switcher can change the message on each display 51–54 to red if so desired.

The output of the router 41 that is fed to the computer 56 can be decoded to determine the desired message and address for each of the displays 51–54. Optionally the output of the router or any process control device can be fed directly to the displays. Computer 56 sends the message along with the address to each display whereas the serial data from the switcher 40 determines the color of the displayed message.

The displays 51–54 can also have external devices connected thereto. For example, tapedeck 42, receiver 43, video camera 44 and a general device 45 which can be any tally requiring device, can be connected to receive the SC outputs from displays 51–54. In this way, when the relay closes in any one of the four displays, this can be interpreted by the devices 42–45 and a desired operation can follow. For example, the tapedeck may start to run.

The tapedeck 42 may also have an output into the external switch 2 of display 54 so that a particular operation of the tapedeck 42 may override the display in display 54 so that it appears in red upon that occurrence.

Figure 8:
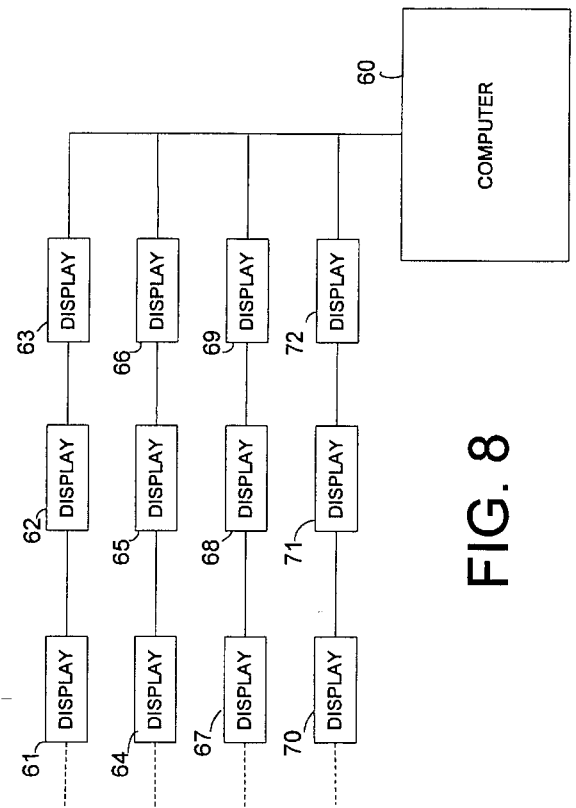
FIG. 8 is a block diagram of a sports scoreboard display system in accordance with the present invention.
Figure 9:
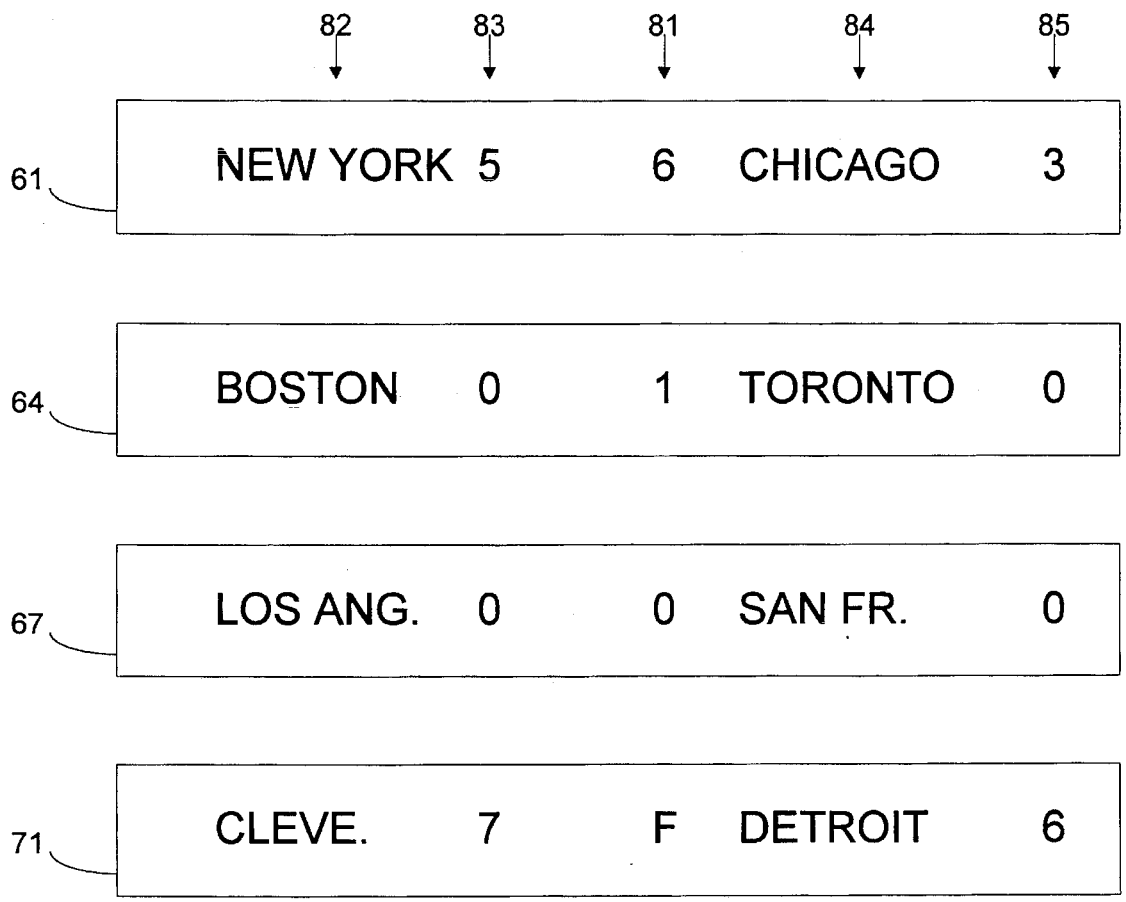
FIG. 9 shows a detail of the display system of FIG. 8.

FIGS. 8 and 9 show a sports scoreboard system using displays according to the present invention wherein a matrix of displays 61–72 are interconnected via their data in and data out connectors so that they all receive serial data from computer 60.

As shown in FIG. 9, the displays have the messages including the name of the teams 82, 84, the current status of the game 81, which can be the inning or the fact that the game is a final score, rain delay or postponed, and the current score of the game at locations 83 and 85.

The computer 60 controls the colors of the displays so that, for example, for baseball the teams will be in red when it is at bat and green when it is in the field, and the inning is in yellow. A special situation can be indicated such as that in display 67 where the game is not started all of the message characters are in yellow, or in a situation where the game is displayed or over such as in display 70, all of the message is in green.

As a result of the use of the display in this manner, a visual indication of important changes or important situations can be immediately identified for the user.

The messages and the colors of the messages on the displays can be controlled via computer software on the computer wherein a grid appears on the screen with all of the information and which can be changed via entries on the keyboard of the computer.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

What is claimed is:

1. A display system for use in a broadcast environment with monitors and broadcast signal sources, comprising a plurality of displays each having a unique one of 256 addresses and each for displaying the status via color and identifying mnemonic of a broadcast input to a monitor and means connecting the displays in a network for receiving real time serial data from a host computer and a plurality of broadcast signal sources, wherein each display comprises: a matrix of display pixels each receptive of a drive signal for energizing same to emit light of one of a plurality of colors; a random access memory for storing a plurality of predetermined messages and color data corresponding thereto; bidirectional addressable means receptive of the serial data from the plurality of broadcast signal sources corresponding to the address of the display, a real time message and at least one color for the message, wherein the addressable means has actuatable talk back signals for acknowledging receipt of serial data; a microprocessor for reading the address data and for converting the serial data into display drive signals corresponding to the real time message and selected color, wherein the microprocessor has interrupt inputs responsive to an activation of switch inputs connected thereto via a connector to override a real time message currently being displayed with a stored message or a color change of the real time message to indicate status; switch means for controlling the addressable means to disable the talk back signals whereby data can be received by the display without an acknowledgement and more than one display can be assigned the same address when desired.

2. The display system according to claim 1, wherein the addressable means comprises an asynchronous receiver-transmitter for receiving and transmitting serial data at selected baud rates.

3. The display system according to claim 1, wherein the addressable means comprises an asynchronous receiver-transmitter for receiving and transmitting serial data with the handshaking signals.

4. The display system according to claim 3, wherein switch means for controlling the disabling of talk back communications comprises a manually actuatable switch actuated prior to receipt of data.

5. The display system according to claim 1, further comprising a clock circuit synchronized to an external time reference and wherein for applying a real time of day time code to the microprocessor.

6. The display system according to claim 1, wherein the microprocessor displays the messages in a proportionally spaced font.

7. The display according to claim 1, wherein the matrix of display pixels is in a first housing and the memory microprocessor and addressable means are in a second housing, a cable connecting the first and second housings, means for applying drive signals from the microprocessor to the cables for receipt by the matrix of display pixels.

* * * * *